Aug. 24, 1926.  
C. L. VINCENT  
1,597,638

VEHICLE RUNNING BOARD

Filed June 2, 1923

WITNESSES  
INVENTOR  
C. L. VINCENT  
ATTORNEYS

Patented Aug. 24, 1926.

1,597,638

UNITED STATES PATENT OFFICE.

CHARLES LOUIS VINCENT, OF NEW HAVEN, CONNECTICUT.

VEHICLE RUNNING BOARD.

Application filed June 2, 1923. Serial No. 643,105.

The present invention relates to new and useful improvements in vehicles, and it pertains more particularly to running boards therefor.

It is one of the objects of the invention to provide a new and improved running board by means of which dirt and the like may be scraped from the shoes of a person before entering a car, the scraping being facilitated by the construction of the running board.

It is a further object of the invention to construct the running board in such a manner that it will have an open or grill tread surface.

It is a further object of the invention to provide means for preventing the wheels of the vehicle from throwing mud, water, etc., upwardly through the grill surface of the running board.

It is a further object of the invention to construct the running board in such a manner that it will have overlapped relation with the side apron of the car body, and also with the front and rear mud guards on the side of the vehicle on which the running board is used.

It is a still further object of the invention to provide new and novel means for supporting the running board in operative position.

Figure 1:
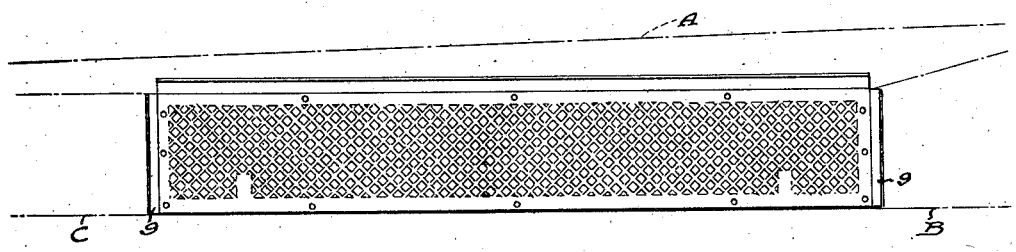
Figure 2:
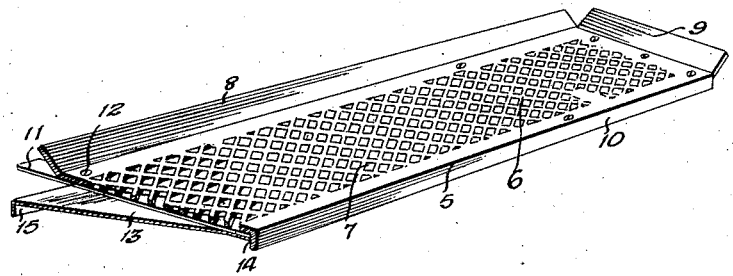

With the above and other objects in view, reference is had to the accompanying drawings, in which Figure 1 is a plan view of a running board constructed in accordance with the present invention, showing the side apron and mud guards of a vehicle in dot-and-dash lines;

Fig. 2 is a detail sectional view in perspective of the running board.

Referring to the drawings, the reference character 5 designates the running board and said running board has a tread surface 6. The tread surface 6 is in the form of a grill and is provided with perforations or openings 7 passing therethrough. The inner edge of the running board 5 is defined by an angularly disposed upstanding flange 8, and at each end of the running board 5 there is an angularly disposed upstanding flange 9. The forward edge of the running board is defined by a downwardly turned flange 10. The flanges 8, 9 and 10 heretofore mentioned are preferably formed integral with the running board 5, and the inner flange 8 is adapted to be received behind or beneath the finishing apron or side apron of the vehicle body, which apron is designated by the reference letter A in Fig. 1. The rear end flange 9 is adapted to be received behind or beneath the rear mud guard, designated by the reference letter B in Fig. 1, while the front end flange 9 is adapted to be received behind the front mud guard designated by the reference letter C in Fig. 1.

The running board 5 is supported in position on a vehicle by means of a plurality of brackets 11, which are suitably secured to the vehicle body or frame in any desired manner, and such brackets extend outwardly from the frame and lie beneath the running board 5. The running board is secured to these brackets by means of screws, bolts, or the like, 12.

The guard 13 comprises an elongated sheet metal body mounted beneath the running board 5 and serves to prevent the wheels of the vehicle throwing mud, water, etc., upwardly through the openings 7 in the running board 5. The forward edge of this guard 13 engages the downwardly turned flange 10, as designated by the reference character 14, and the rear edge of this guard 13 is provided with a flange 15 adapted to form the means by which the guard 13 is secured in place upon the vehicle.

From the foregoing it is apparent that the present invention provides a running board for vehicles in which dirt, etc., may be scraped from the shoes of a person entering the vehicle by reason of the roughened surface presented by the grill structure on the tread surface of the board. Furthermore, by providing the flanges 8 and 9, a neat appearance is imparted to the running board when the same is positioned on the vehicle, and by providing the guard 13, the throwing of mud, water, etc., through the board by the wheels of the vehicle, is prevented.

What is claimed is:

1. A running board for vehicles comprising a main body portion having a perforated area, an upturned flange defining the rear edge of said body portion, an upturned flange defining each end of said body portion, a downwardly turned flange defining the front edge of said body portion, a pan-like mud guard secured to said running board at its forward edge behind the downwardly turned flange and extending transversely across and beneath the running board and extending throughout the length thereof, and supporting braces for the running board, said supporting braces passing between the running board and said angularly disposed pan-like member and forming supporting brackets for the running board, and means at the rear edge of the mud guard for securing it to the vehicle.

2. A running board for automobiles of the type embodying side aprons and front and rear mud guards, and comprising an oblong main body portion having an oblong perforated area, an upturned and angularly disposed flange defining the rear edge of said body portion, said flange adapted to be received behind or beneath the side apron of the automobile, an upturned angularly disposed flange defining the front and rear ends of said board, said end flanges adapted to be received behind or beneath the front and rear mud guards respectively, a downwardly turned flange defining the front edge of said board, a pan-like guard member comprising an oblong metal plate secured at its forward edge to said running board behind the downwardly turned flange and extending transversely rearwardly across and beneath the running board and having a flange at its rear edge for securing the same upon the side of the automobile, and supporting braces for the board, said braces extending from said front flange and passing between the running board and said guard member and forming supporting brackets for attachment of the running board to the automobile.

CHARLES LOUIS VINCENT. [L. S.]